May 22, 1923.  1,456,076
C. W. ROBBINS
MEASURING AND TESTING OF INDUCTANCES
Filed June 18, 1921   5 Sheets-Sheet 1

Inventor
Charles W. Robbins
by G. M. Campbell
Atty.

May 22, 1923.

C. W. ROBBINS

MEASURING AND TESTING OF INDUCTANCES

Filed June 18, 1921   5 Sheets-Sheet 2

Inventor
Charles W. Robbins
by G. M. Campbell
Atty.

May 22, 1923.

C. W. ROBBINS 1,456,076

MEASURING AND TESTING OF INDUCTANCES

Filed June 18, 1921   5 Sheets-Sheet 3

Inventor
Charles W. Robbins
by [signature]
Atty.

May 22, 1923.                                                 1,456,076
C. W. ROBBINS
MEASURING AND TESTING OF INDUCTANCES
Filed June 18, 1921              5 Sheets-Sheet 4

Fig. 13.

| READING IN HENRY | POSITION OF CENTRAL SPG'S | | | | |
|---|---|---|---|---|---|
| | .020 CAM | .040 CAM | .080 CAM | .160 CAM | .160 CAM |
| 0 | IN | IN | IN | IN | IN |
| .020 | OUT | IN | IN | IN | IN |
| .040 | IN | OUT | IN | IN | IN |
| .060 | OUT | OUT | IN | IN | IN |
| .080 | IN | IN | OUT | IN | IN |
| .100 | OUT | IN | OUT | IN | IN |
| .120 | IN | OUT | OUT | IN | IN |
| .140 | OUT | OUT | OUT | IN | IN |
| .160 | IN | IN | IN | OUT | OUT |
| .180 | OUT | IN | IN | OUT | OUT |
| .200 | IN | OUT | IN | OUT | OUT |
| .220 | OUT | OUT | IN | OUT | OUT |
| .240 | IN | IN | OUT | OUT | OUT |
| .260 | OUT | IN | OUT | OUT | OUT |
| .280 | IN | OUT | OUT | OUT | OUT |
| .300 | OUT | OUT | OUT | OUT | OUT |

Inventor
Charles W. Robbins
by G. M. Campbell
Atty.

May 22, 1923.

C. W. ROBBINS 1,456,076

MEASURING AND TESTING OF INDUCTANCES

Filed June 18, 1921   5 Sheets-Sheet 5

Fig.12

Inventor
Charles W. Robbins
by J.M.Campbell
Atty.

Patented May 22, 1923.

1,456,076

UNITED STATES PATENT OFFICE.

CHARLES WILLIAM ROBBINS, OF LA GRANGE, ILLINOIS, ASSIGNOR TO WESTERN ELECTRIC COMPANY, INCORPORATED, OF NEW YORK, N. Y., A CORPORATION OF NEW YORK.

MEASURING AND TESTING OF INDUCTANCES.

Application filed June 18, 1921. Serial No. 478,692.

*To all whom it may concern:*

Be it known that I, CHARLES WILLIAM ROBBINS, a citizen of the United States, residing at La Grange, in the county of Cook and State of Illinois, have invented certain new and useful Improvements in the Measuring and Testing of Inductances, of which the following is a full, clear, concise, and exact description.

This invention relates to the measuring and testing of inductances, and more particularly to an apparatus by means of which inductances may be rapidly and accurately measured, tested and adjusted by one without particular skill or mental training.

The invention is particularly useful for measuring loading coils used in the telephone art. In the manufacture of these coils they are generally wound with an excess number of turns of wire which may be easily removed if the coil in its test shows a greater inductance than is required, or if it does not come up to the required inductance, turns of wire may be added.

The object of the invention in general is to provide a simple, accurate and efficient apparatus which indicates directly by a reading index the necessary adjustment required in turns of wire to be removed or added to a coil to arrive at a specified inductance and without any substantial mental calculation on the part of an operator.

Another object of the invention is to provide an apparatus for the efficient measuring of a plurality of coils and also of coils in which the number of terminals varies.

In accordance with the general features of this invention, there is provided an apparatus comprising a variable inductance equipped with a multiple scale which is movable therewith. Each of the scales of the multiple scale is calibrated for a different range of inductance values, whereby a plurality of coils with different requirements of inductance may be measured. In conjunction with the variable inductance are a plurality of fixed value inductances which are cut into or out of the circuit by a switch which in its operation automatically cuts out or into the circuit certain compensating resistances so that the total effective resistance in the circuit will be held constant. Connected with the switch is a reading index for the multiple scale which gives the combined value of the variable inductance with one or more of the fixed inductances which have been connected in the circuit by the operation of the switch. A special scale or tape may be provided in conjunction with each scale of the multiple scale to indicate, in co-operation with a suitable bridge circuit, when the inductance of a given type of coil is within specified limits and when it is not, and to indicate directly the necessary adjustment required in terms of turns of wire to be removed or added.

To efficiently measure coils in large numbers and coils in which the number of terminals varies a selecting switch combined with a terminal connecting fixture and a loading jig is provided. This may comprise a switch adapted in one position to connect the terminals of one coil of a plurality of coils mounted on a jig into the measuring circuit, and thereafter by the operation of the switch the other coils may in turn be measured without any manipulation of the terminals thereof by the operator. The terminals of the coils are conveniently connected to the loading jig beforehand, after which the jig is connected to the connecting fixture and this in turn is connected to the selecting switch in accordance with the number of coils which the switch and jig are adapted to accommodate.

Figure 1:
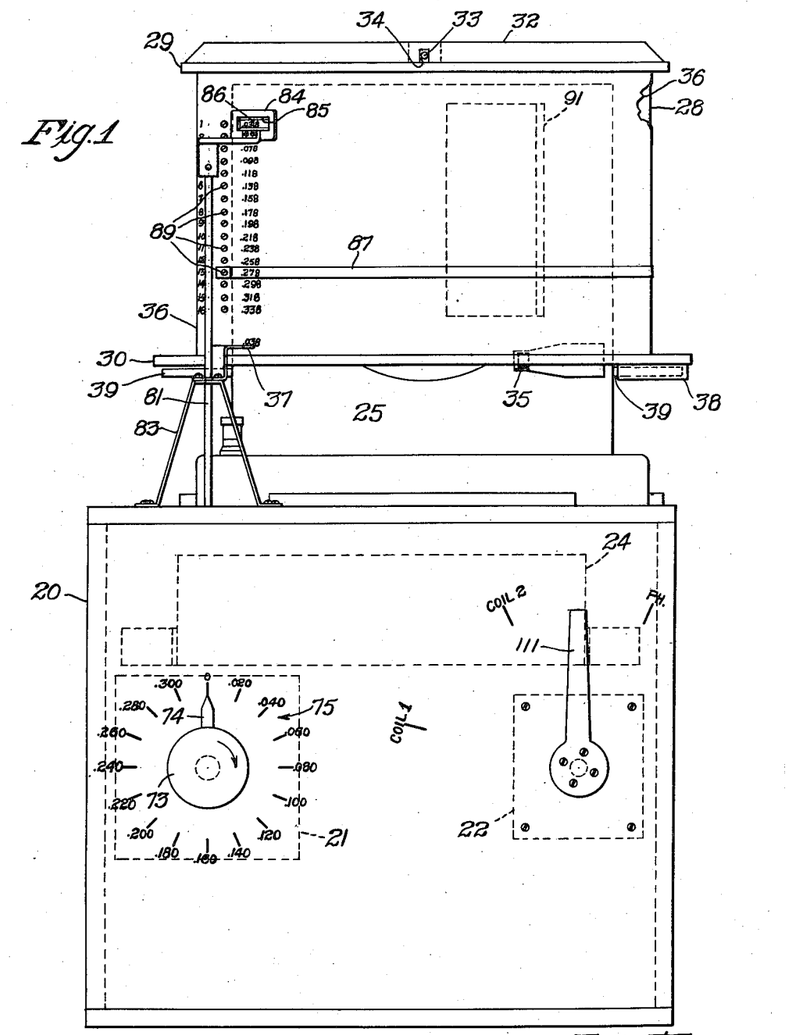
Fig. 1 is a front view of one form of measuring apparatus embodying the features of this invention.
Figure 2:
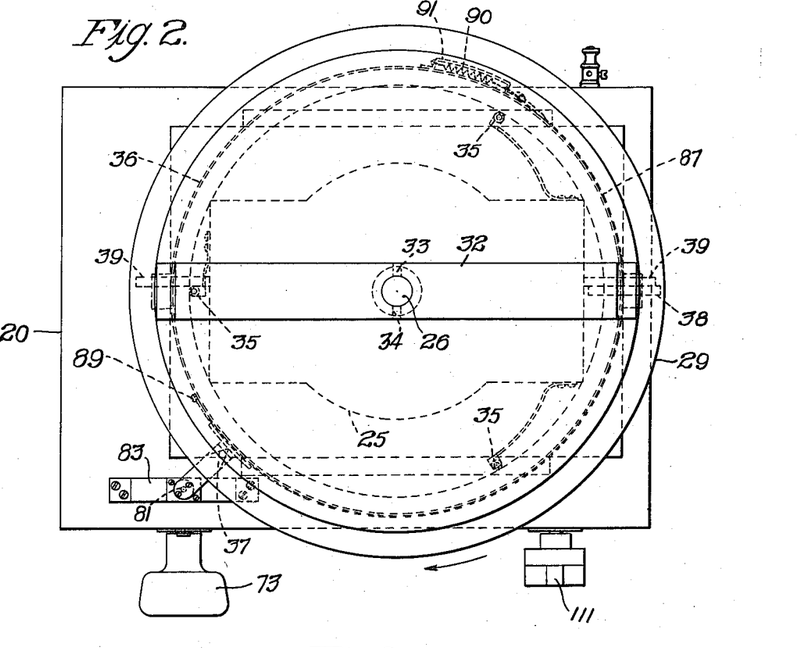
Fig. 2 is a plan view thereof.
Figure 9:
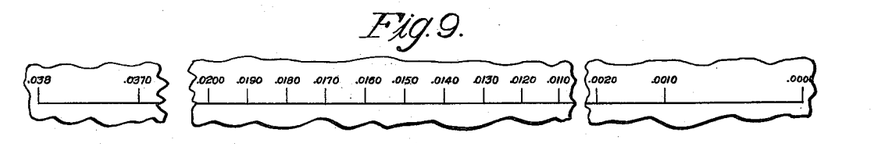
Fig. 9 is an enlarged partial detail view of a typical calibration scale of the inductometer or master scale at the top of the rotatable drum.
Figure 10:
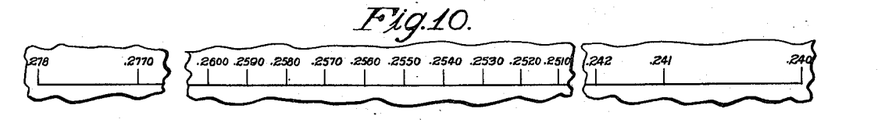
Fig. 10 is an enlarged partial detail view of scale number 13 on the drum.

Referring to Fig. 1, 20 indicates a housing for a compensating switch 21, a selecting switch 22, and a second housing 24 for compensating resistances. The housing 20 supports upon its upper surface a standard variable inductometer 25. Secured to the vertical rotatable shaft 26 of the inductometer 25 is a cylinder or drum 28 equipped with upper and lower flanges 29 and 30. The upper flange 29 extends across the top of the drum and forms a closure therefor with the lower end thereof open. Secured to the upper flange 29 is a cross piece 32 into which the shaft 26 extends and is secured thereto by a pin 33 which extends therefrom and into a suitable slot 34 formed in the cross piece 32. Flexibly mounted guide roller members 35—35 are secured to the frame of the inductometer 25 in line with the lower flange 30 to steady the drum when it is revolved. On the outside surface of the drum is secured a sheet of Bristol board 36 or any suitable material upon which is laid out a set of scales numbered from 1 to 16. The upper scale or scale number 1 is the calibration scale of the particular inductometer or what may be called the master scale, and begins at 0 henry, representing 180° on the inductometer, and ends at .038 henries, with the rest of the scales plotted therefrom by adding .020 henries successively to each scale in a downward direction and successively adding .001 henry to each scale reading in a clockwise direction. Each of the scales is therefore calibrated for a different range of inductance values. Below scale number 16 is a scale (shown in Fig. 9) which is a duplicate of scale number 1 to enable an operator to read the value of the variable inductance at any time by means of a stationary index 37.

A stop member 38 secured to the under side of the flange 30 of the revolvable drum 28 functions to limit the rotating movement of the drum to an arc of 180° by coming into contact with stationary stop pins 39 suitably positioned on a stationary portion of the inductometer.

Figure 3:
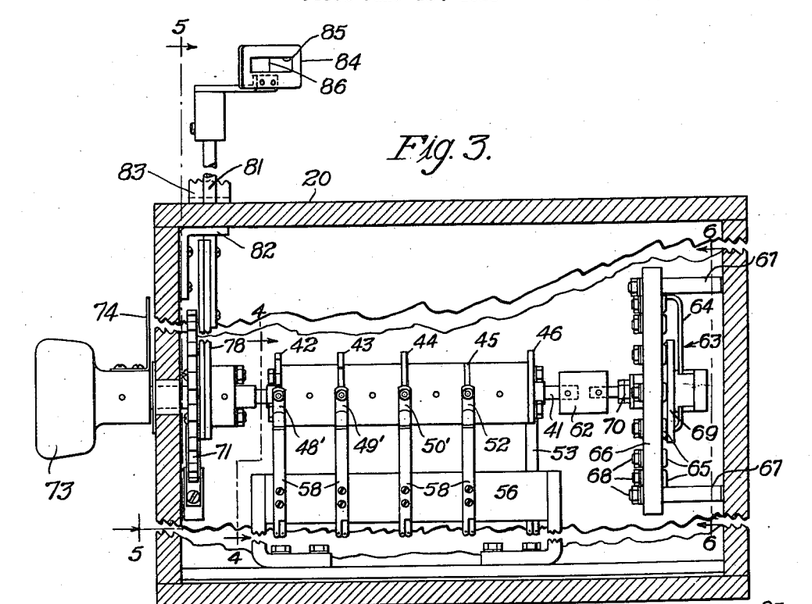
Fig. 3 is an enlarged side view of the compensating switch with portions of the movable index mechanism broken away and the housing shown in section and partially broken away.
Figure 4:
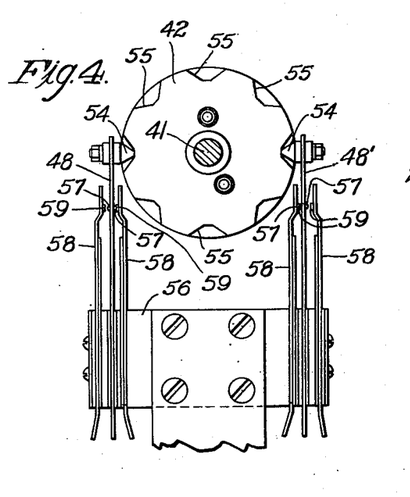
Fig. 4 is an end view of the compensating switch taken on the line 4—4 of Fig. 3.
Figure 5:
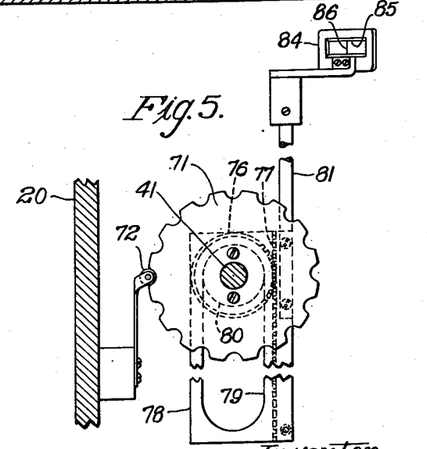
Fig. 5 is a vertical section taken on the line 5—5 of Fig. 3 with portions broken away.

The compensating switch 21 located below the drum 28 consists of a rotatable shaft 41 carrying a set of cam wheels 42, 43, 44, 45, and 46, all of which are suitably insulated from each other and from the shaft 41. The cam wheels 42, 43, and 44 are each adapted to operate a pair of double throw switch blades 48, 48', 49, 49' and 50, 50' respectively, one on each side thereof, while the cam wheels 45 and 46 are adapted to operate similar switch blades 52 and 53 respectively, but only on one side thereof, with blade 52 positioned on the side of the shaft opposite to the blade 53. All the switch blades are equipped at their upper ends with suitable projections 54, 54 which ride on suitable cam surfaces 55, 55 formed on the cam wheels and at their lower ends are supported by a block 56 of some suitable insulation. Intermediate their ends the blades are equipped on both sides with contact points 57, 57 which alternately open and close a circuit through switch members 58, 58 to cut in or out of the circuit certain standard inductances. The switch members 58, 58 are equipped with contact points 59, 59 and are also supported by the block 56.

Figure 6:
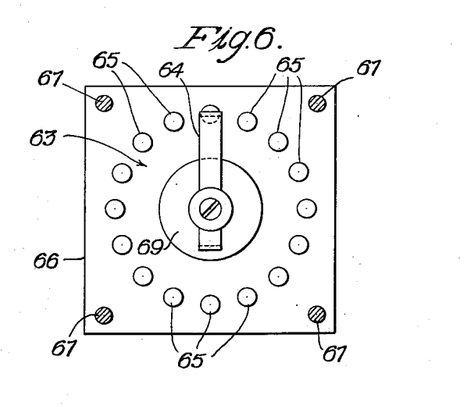
Fig. 6 is a vertical section on the line 6—6 of Fig. 3 showing an end view of the multiple switch.

Connected to the rear end of the shaft 41 by a coupling 62 composed of some suitable insulating material is a multiple point rotatable switch 63 for connecting in the circuit certain compensating resistances so that the total effective resistance in the circuit may be held constant automatically. The switch 63 consists of a rotatable switch member 64 which at one end is adapted to make contact at separate times with one or another of a set of sixteen stationary contacts 65—65 secured to a supporting block 66 preferably made of insulating material and which in turn is secured to the housing by a plurality of supporting members 67—67. The contacts 65—65 are each connected to a certain resistance through binding posts 68—68 on the opposite side of the supporting block 66. The other end of the switch member is always in contact with a stationary contact disk 69 which is connected to one terminal of the coil under test by a binding post 70 on the shaft 41.

Upon the forward end of the shaft 41 is secured a disk 71 provided with sixteen notches cut in its peripheral surface which function with a flexibly mounted roller 72 which is suitably mounted on the casing and at one side thereof to hold the shaft 41 with the switch member 64 in any one of its sixteen positions when rotated to contact with any of the contacts 65—65. The forward end of the shaft 41 projects outside of the housing 20 and has suitably secured thereto a switch operating handle 73 carrying an indicator 74 which registers with a scale 75 marked on the front of the housing 20. The scale 75 is marked off into sixteen readings representing inductance in henries beginning with 0 and increasing .020 henries for each successive reading in a clockwise direction, the highest reading being .300 henries. Secured to the shaft 41 at the rear of the notched disk 71 is a pinion 76 which engages a rack bar 77 secured to one side of a slidable plate 78 provided with an elongated opening 79 which rides on a disk 80 suitably secured in position on the shaft 41. The length of the opening 79 is such that when the indicator 74 is positioned at 0, the bottom thereof abuts against the disk 80, thereby limiting its movement in a counter-clockwise direction, and when the indicator is positioned at .300 the top of the opening 79 abuts against the disk 80 to limit its movement in a clockwise direction.

To the upper end of the slidable plate 78 is attached a rod 81 which projects through the top of the housing 20 and is guided by a bracket 82 secured to the under side thereof and also by a bracket 83 located on the top of the housing 20. The bracket 83 carries the stationary index 37. The rod 81 has secured at its upper end a reading index for the multiple scale on the drum 28 consisting of a frame 84 shaped to ride close to the surface of the Bristol board 36 and provided with an opening 85 within which is affixed a hairline index 86. The gear ratio between the pinion 76 and the rack bar 77 is such that upon turning the indicator 74 in a clockwise direction from 0 to .020, for instance, the index 86 will be moved from scale number 1 of the multiple scale on the drum 28, its normal position, to scale number 2, which indicates that the inductance in this arm of the bridge has been reduced by .020 henries.

In manufacturing coils where a specified inductance is required they are preferably wound with an excess number of turns of wire which may be later easily removed if the coil in its test shows a greater inductance than is required, or if it does not come up to the required inductance, turns of wire are added. To readily and efficiently determine the number of turns of wire to take off or add to a coil after being measured, a particular scale suitable for the coil under test is provided in conjunction with each scale of the multiple scale on the drum, to indicate in co-operation with a suitable bridge circuit when the inductance of a given type of coil is within specified limits, and when it is not, to indicate directly the necessary adjustment required in turns of wire to be added or removed.

It will be apparent that the multiple scale on the drum can not be used readily and efficiently to determine what these changes should be for these scales give only the inductance value of the coil in terms of henries of inductance, and not the number of turns of wire to take off or add to the coil being tested to give it the required inductance.

Figure 11:
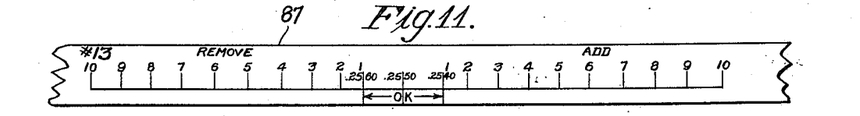
Fig. 11 is an enlarged partial detail view of the special scale or tape which is applied over scale number 13 on the drum.

A scale or tape 87 which determines what changes must be made in the coil under test is shown on Fig. 11 and is numbered 13 indicating that it is to be used in conjunction with scale number 13 on the drum and when in use is held in place over the scale by having its ends, which are provided with suitable eyes, hooked over a screw or pin 89 secured in the drum 28, one for each tape, at one end, with the other end secured to one end of a spring 90 secured, one for each tape, to a bracket 91, thereby keeping the tape, which is preferably made from material which will not shrink or lengthen after it has been made, taut against the Bristol board on the peripheral surface of the drum. Scale or tape number 13 is used for measuring coils requiring .2550 henries inductance, as the average, with any point up to .2560 henries as the maximum, or down to .2540 henries as the minimum limits. The calibration beginning with 1 and ending with 10 at each side of the readings .2560 and .2540 indicate turns of wire to be removed or added respectively, with all calibrations to the right of .2550 preferably made with red ink. The special scales or tapes 87 are laid out from the master scale illustrated in Fig. 9, which scale is calibrated for the particular inductometer with which it is used.

Figure 7:
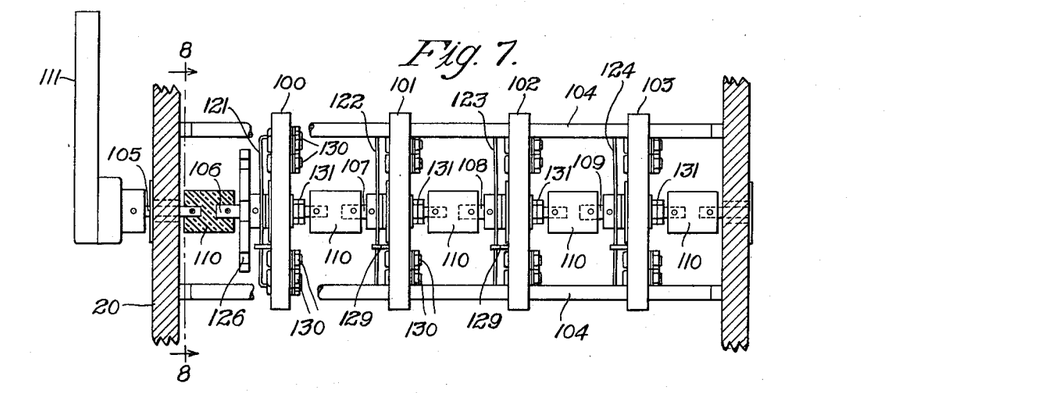
Fig. 7 is an enlarged side view of the selecting switch with a portion thereof and of the housing shown in section.
Figure 8:
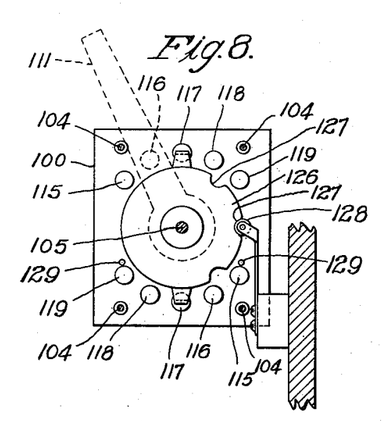
Fig. 8 is a vertical section taken on the line 8—8 thereof with the indicator handle shown in dotted outline.

To efficiently measure new side circuit coils when a large number are to be measured, the selecting switch 22 (see Figs. 1, 7, and 8) is provided, and associated therewith is a loading jig and a terminal connecting fixture (not shown) which comprise suitable means for holding the coils with their terminals adapted to be readily connected to the connecting fixture which is connected to the selecting switch 22. The selecting switch, jig, and connecting fixture are also used in testing coils to be used in phantom telephone circuits. At one side of the compensating switch 21 is the selecting switch 22 which comprises rectangular shaped supporting members 100, 101, 102, and 103 made from some suitable insulating material and supported from the housing 20 by rods 104—104. A rotatable shaft 105 comprising relatively short lengths of rod 106, 107, 108, and 109, preferably made of metal, are connected together and insulated from each other by couplings 110—110 made from some suitable insulating material. Each of the rod lengths 106, 107, 108, and 109 passes through and is rotatably supported in one of the supporting members 100, 101, 102, and 103. To the forward end of the shaft 105, which extends through the housing, is suitably secured a switch indicator 111, the use of which will be explained later. Radially positioned upon each supporting member of the switch 21 are a plurality of contacts comprising five pair of contacts 115, 116, 117, 118, and 119 with the contacts forming each pair positioned diametrically opposite each other. Suitably secured to the shaft 105 in front of each set of contacts and adapted to make contact therewith are switch blades 121, 122, 123, and 124. In front of the switch blade 121 and suitably secured to the shaft 105 is a disk 126 provided with three suitably spaced notches 127—127 cut in its peripheral surface which co-operate with a flexibly mounted roller 128 which is suitably mounted in the housing and at one side thereof to hold the switch blades 121, 122, 123, and 124 in any one of their circuit closing positions which comprise the paired contacts 115, 117, and 119. The paired contacts 116 and 118 located between the circuit closing contacts are for the purpose of holding the switch blade in position while passing from one contact to another.

Stop pins 129—129 are suitably positioned upon each of the supporting members 100, 101, etc., to limit the movement of the switch blades in either direction. The contacts are all provided with suitable binding posts 130, 130 on the opposite side of the supporting members. Binding posts 131—131 are secured to the rods 106, 107, 108, and 109 respectively, which rods are in electrical contact with the switch blades. Upon the outside of the housing are three points which are designated as Coil 1, Coil 2, and Ph., the latter being an abbreviation for phantom. These three marks correspond to the paired contacts 115, 117, and 119, and their use will be described later in connection with the description of the circuit drawing.

A side circuit coil consists of two coils formed as one with the four terminals thereof extending therefrom and properly designated, while a phantom coil consists of four coils formed as one with the eight terminals thereof extending therefrom and also properly designated. In measuring new side circuit coils with this apparatus, they are preferably mounted in pairs on the jig 141 with the four terminals on each coil suitably connected to eight terminals on the jig 141 which connect through the fixture 150 with selected contacts of the selecting switch 22. The jig 141 and fixture 150 are indicated in broken outline on Fig. 12. In measuring new phantom coils by this apparatus, they are also mounted on the jig 141 with the eight terminals suitably connected to the eight terminals on the fixture 150 which is suitably connected to selected contacts of the switch 22.

Figure 12:
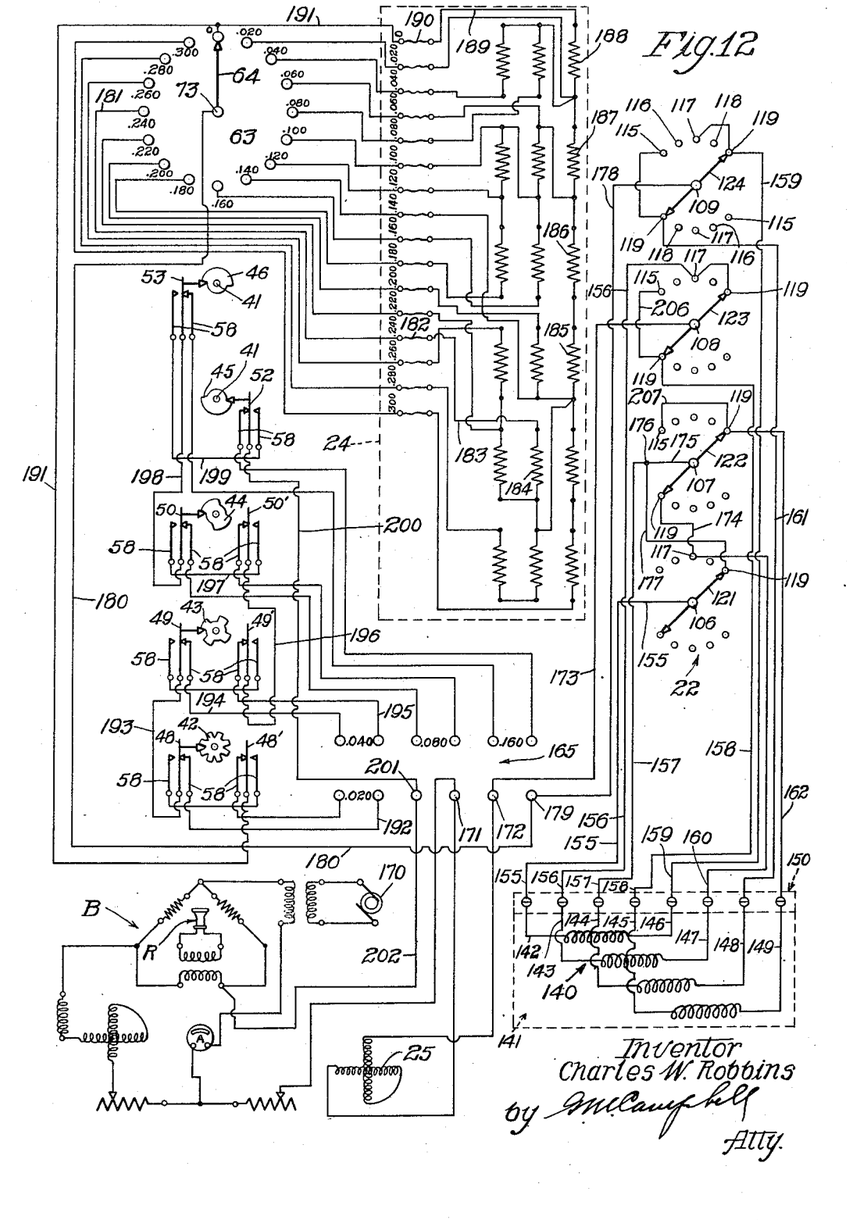
Fig. 12 is a circuit diagram of the measuring apparatus with the selecting switch shown in position for testing a set of coils to be used in a phantom telephone circuit.
Figure 13:
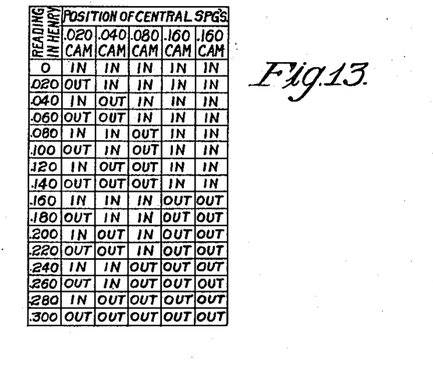
Fig. 13 is a sequence table for the compensating switch which indicates the position of the central blades with the switch handle set for different readings in henries.

The operation of the apparatus, with reference to the circuit diagram, is as follows:

Assuming that the phantom coil 140 to be measured is required to give an inductance of .2550 henries as the average; the operating handle 73 of the compensating switch 21 is turned in a clockwise direction until the indicator 74 is opposite the reading .240 henries which is the inductance nearest the desired requirement before the next highest reading .260 henries. This movement of the handle 73 through the switch 21 reduces the inductance in this arm of the bridge circuit .240 henries and at the same time through the multiple point rotatable switch 63 suitable compensating resistances are connected in the circuit. In operating the handle 73 the index 86 will be moved from scale number 1 to scale number 13, which scale covers a range of inductance values from .240 to .278 henries. The special tape 87 numbered 13, which is the tape that has been calibrated to indicate directly the number of turns of wire to add on or take off of a coil requiring .2550 henries as the average inductance, is now secured in place on the drum 28 over the scale number 13 thereon. The selecting switch indicator handle 111 is now turned until it indicates "Ph.", which movement sets the switch blades 121, 122, etc., in the position shown in the circuit diagram. In this diagram a suitable bridge circuit is shown, which is indicated at B, with the ratio between the arms adapted to be set in a well-known manner for the purpose of obtaining the best and most efficient operation of the bridge. In the bridge B a receiver R is included which is held by the operator to his ear and which functions to indicate by its tone the condition of the balance in the arms of the bridge circuit.

In the circuit diagram the switch member 64 is shown in its 0 position with the switch blades 48, 48', 50, etc., operated through the cams 42, 43, etc., to include in the circuit standard inductances of .020, .040, .080, and .160 henries in value which are indicated at 165. In turning the indicator handle 73 from 0 to .240 henries the inside switch members 58—58 associated with the cams 44, 45, and 46 are disconnected from the switch blades 50, 50', 52 and 53, thereby decreasing the inductance in this arm of the bridge circuit .240 henries. With the switch members 58—58 in this position the circuit may be traced as follows: from generator 170 through the properly balanced bridge B to the point 171, thence through the standard variable inductometer 25 to the point 172 which is connected to the switch blade 123 of the selecting switch 22 by the lead 173. At this point the current divides, one part passing through upper contact 119 of the switch blade 123, lead 156, coil terminal 143, through the coil, other terminal 147 thereof, and lead 160 to upper contact 117 associated with switch blade 121, lead 174 and to lower contact 119 associated with switch blade 122. At the same time the circuit through lower contact 119 of switch blade 123 is as follows, to lead 158, coil terminal 145, through the coil, other terminal 149 thereof, and lead 162 to the upper contact 119 associated with the switch blade 122. Here the current joins and passes through the switch blade 122, lead 175 to point 176 where it divides again, one part flowing through lead 157, coil terminal 144, through the coil, other terminal 148 thereof and lead 161 to lower contact 119 associated with switch blade 124. From point 176 the other part flows through lead 177 to upper contact 119 associated with switch blade 121, lead 155, coil terminal 142, through the coil, connecting terminal 146 thereof and lead 159 to upper contact 119 associated with switch blade 124. The current now joins again and passes through lead 178, point 179, lead 180 to switch member 64 of the multiple point switch 63, thence through lead 181 (which has been connected into the circuit by the operation of handle 73), resistance 182, lead 183, through resistance coils 184, 185, 186, 187, and 188 which represent respectively 8, 12, 12, 16 and 12 ohms resistance. The resistance 182 and resistance coils 184, 185, etc., are mounted in the housing 24 indicated in dotted outline on Fig. 1. From resistance coil 188 the circuit is as follows: lead 189, through lump resistance 190, lead 191, switch blade 48′, inside switch member 58 thereof, through standard inductance .020 indicated at 165, lead 192, inside switch member 58 of the switch blade 48, lead 193 to switch blade 49, inside switch member 58 thereof, lead 194, through inductance .040, lead 195 to inside switch member 58 of the switch blade 49′, lead 196 to switch blade 50′, outside switch member 58, (switch blades 50′, 52 and 53 have been operated in setting the handle 73 to make contact with the outside switch members 58) lead 197 to outside switch member 58 of the switch blade 50, lead 198 to switch blade 53, outside switch member 58, lead 199 to outside switch member 58 of switch blade 52, lead 200, to point 201 and lead 202 through the bridge circuit B in the well-known manner to the other side of the generator 170.

With the above described circuit, which is set up by moving the handle 73 from 0 to .240 and moving the selecting switch handle 111 to Ph., the operator is now ready to measure the inductance of the coil 140 which is done by turning the drum 28 in a clockwise direction by means of the flange 30 until the index 86 is in line with the reading .2550 on the special scale or tape number 13 laid over scale number 13. on the drum.

When in this position or between the marks .2560 and .2540 and no tone is heard in the receiver R by the operator, it indicates that the coil is O. K. in its inductance and is acceptable. If a tone is heard, the operator revolves the drum to either side of the marks .2560 and .2540, depending in which direction the tone decreases, until the tone is not heard, and according to whether the index 86 is to the left of the mark .2560 or to the right of the mark .2540 will decide the number of turns of wire which are to be removed or added respectively to the coil, depending on what number on the scale the index is nearest when the tone in the receiver ceases.

When measuring a pair of new side circuit coils which are mounted on the jig 141 and connected to the fixture 150, the selecting switch handle 111 is moved over the mark Coil 1, which moves the switch blades 121, etc., to close a circuit through the contacts 115, and thereafter the circuit may be traced as follows: From generator 170 to point 172 the circuit is the same as traced in the case of a phantom coil. From point 172, lead 173 to the switch blade 123, upper contact 115 thereof, lead 206, lower contact 119 of the switch blade 123, lead 158, coil terminal 145, through the coil, other terminal 149 thereof, and lead 162 to the upper contact 119 of the switch blade 122, lead 207 to upper contact 115 of switch blade 122, lead 175, past point 176 to lead 157, coil terminal 144, through the coil, other terminal 148 thereof and lead 161 to lower contact 119 of switch blade 124. From switch blade 124 the circuit is the same as before described in the case of a phantom coil.

After measuring coil number 1, the operator moves the handle 111 over the mark Coil 2, which moves the switch blades 121, etc., to close a circuit through the contacts 117, and thereafter the circuit may be traced as follows: from the switch blade 123, upper contact 117 associated therewith, lead 156, coil terminal 143, through the coil, other terminal 147 thereof, and lead 160 to upper contact 117 associated with the switch blade 121, lead 155, coil terminal 142, through the coil, other terminal 146 thereof, lead 159 to upper contact 117 of switch blade 124. From switch blade 124 the circuit is the same as before described in the case of a phantom coil. When the requirements in inductance vary in the coils, changes in the position of the compensating switch are made by moving the handle 73 to indicate the required inductance mounting the special scale or tape 87 on the drum and thereafter revolving the drum to one side or the other of the index 86 and varying the calibrating resistance to balance the effective resistance of the coil under test until no tone is heard in the receiver. At this point the scale will indicate the variation in the turns of wire on the coil to give it the required inductance.

What is claimed is:

1. In an inductance measuring apparatus, the combination with a bridge circuit of a test specimen, means associated therewith to indicate directly in the operation of said circuit any change required in the test specimen to produce a required inductance, and an index for said means.

2. In an inductance measuring apparatus, the combination with a bridge circuit of a test specimen, a variable inductance, a multiple scale associated therewith, a plurality of fixed inductances, means for connecting in the circuit one or more of said fixed inductances, and an index connected to said means to indicate directly upon said scale the total inductance connected in the circuit.

3. In an inductance measuring apparatus, the combination with a bridge circuit of a test specimen, a variable inductance, a multiple scale associated therewith, a plurality of fixed inductances, means for connecting in the circuit one or more of said fixed inductances, an index connected to said means to indicate directly upon said scale the total inductance connected in the circuit, and compensating resistances automatically cut out or into the circuit whenever said fixed inductances are cut in or out whereby the total effective resistance in the circuit will be held constant.

4. In an inductance measuring apparatus, the combination with a bridge circuit of a test specimen, a variable inductance, a multiple scale connected thereto, a plurality of fixed inductances, means for connecting in the circuit one or more of said fixed inductances, and a vertically movable index operatively connected to said means to indicate directly upon said scale the total inductance connected in the circuit.

5. In an inductance measuring apparatus, the combination with a bridge circuit of a test specimen, a variable inductance, a drum surrounding said inductance and movable therewith, a multiple horizontal reading scale upon the surface of said drum, a plurality of fixed inductances, means for connecting one or more of said fixed inductances into the circuit, and a vertically movable index operatively connected to said means to indicate directly upon said multiple scale the total inductance connected in the circuit.

6. In an inductance measuring apparatus, the combination with a bridge circuit of a test specimen, a variable inductance, a drum surrounding said inductance and movable therewith, a multiple horizontal reading scale upon the surface of said drum, a plurality of fixed inductances, a multiple point switch for connecting one or more of said fixed inductances in the circuit, compensating resistances automatically cut out or into the circuit by said switch whenever said fixed inductances are cut into or out of the circuit whereby the total effective resistance in the circuit will be held constant, and an index operatively connected to said switch to indicate directly upon said multiple scale the total inductance connected in the circuit.

7. In an inductance measuring apparatus, the combination with a bridge circuit of a coil to be tested, a variable inductance, a multiple scale associated therewith, a plurality of fixed inductances, means for connecting in the circuit one or more of said fixed inductances, an index operatively connected to said means to indicate directly upon said scale the total inductance connected in the circuit, and an auxiliary scale associated with said multiple scale and read by said index in the operation of said circuit to indicate directly any change required in the coil in turns of wire to remove or add to produce a required inductance.

8. In an inductance measuring apparatus, the combination with a bridge circuit of a coil to be tested, a variable inductance, a multiple scale connected thereto, an auxiliary scale adapted to be associated with said multiple scale for indicating directly in the operation of said circuit any change required in turns of wire to be removed or added to said coil to produce a required inductance, and an index for reading said auxiliary scale.

9. In an inductance measuring apparatus, the combination with a bridge circuit of a test specimen, a variable inductance, a multiple scale associated therewith, a plurality of fixed inductances, a combined multiple point rotating switch and a vertically movable index, said switch adapted to connect into the circuit one or more of said fixed inductances and in its operation to move said index to indicate directly upon said scale the total inductance connected in the circuit.

10. In an inductance measuring apparatus, the combination with a bridge circuit of a test specimen, a variable inductance, a plurality of fixed inductances, compensating resistances, a multiple point switching device adapted to connect into the circuit one or more of said fixed inductances and simultaneously to cut out or into the circuit one or more of said resistances whereby the total effective resistance in the circuit will be held constant.

11. In an inductance measuring apparatus, the combination with a bridge circuit of a test specimen, a variable inductance, a multiple scale associated therewith, a plurality of fixed inductances, compensating resistances, a combined multiple point rotatable switching device and a vertically movable index, said switching device adapted to connect into the circuit one or more of said fixed inductances and simultaneously to cut out or into the circuit one or more of said resistances whereby the total effective resistance in the circuit will be held constant and in its operation to move said index to indicate directly upon said scale the total inductance connected in the circuit.

12. In an inductance measuring apparatus, the combination with a bridge circuit of a test specimen, a variable inductance, a multiple scale associated therewith, a plurality of fixed inductances, a multiple point rotating switch adapted to connect into the circuit one or more of said fixed inductances, said switch comprising a horizontally disposed shaft, a pinion mounted thereon, an index comprising a vertically movable member, and a rack secured thereto and operated by said pinion to indicate directly upon said scale the total inductance connected in the circuit upon the operation of said switch.

13. In an inductance measuring apparatus, the combination with a bridge circuit of a test specimen, a variable inductance, a multiple scale associated therewith, a plurality of fixed inductances, compensating resistances, a switching device comprising a rotatable shaft carrying a plurality of cams adapted to connect into the circuit one or more of said fixed inductances, a multiple point switch operated by the movement of said shaft to simultaneously cut out or into the circuit one or more of said resistances during the switching of said inductances whereby the total effective resistance in the circuit will be held constant.

14. In an inductance measuring apparatus, the combination with a bridge circuit of a test specimen, a variable inductance, a multiple scale associated therewith, a plurality of fixed inductances, compensating resistances, a multiple point rotating switch adapted to connect into the circuit one or more of said fixed inductances and simultaneously to cut out or into the circuit one or more of said resistances whereby the total effective resistance in the circuit will be held constant, said switch comprising a horizontally disposed shaft, a pinion mounted thereon, an index comprising a vertically movable member, and a rack secured thereto and operated by said pinion to indicate directly upon said scale the total inductance connected in the circuit upon the operation of said switch.

15. In an inductance measuring apparatus, the combination with a bridge circuit of a coil to be tested, a variable inductance, a multiple scale connected thereto, an auxiliary scale for any scale of the multiple scale adapted to be placed thereover for indicating directly in the operation of said circuit any change required in turns of wire to be removed or added to said coil to produce a required inductance, means for holding said auxiliary scales in accurate alinement with the scales on said multiple scale, and an index for reading said auxiliary scale.

In witness whereof, I hereunto subscribe my name this ninth day of June A. D., 1921.

CHARLES WILLIAM ROBBINS.